United States Patent [19]

Aizawa et al.

[11] 3,891,312

[45] June 24, 1975

[54] ELECTRICAL DRIVING DEVICE FOR FILM MECHANISM

[75] Inventors: Hiroshi Aizawa, Tokyo; Tadashi Ito; Fumio Itoh, both of Yokohama; Kiyoshi Takahashi, Tokyo; Yasuo Isobe, Kawasaki, all of Japan

[73] Assignee: Canon Kabushiki Kaisha, Japan

[22] Filed: Dec. 14, 1973

[21] Appl. No.: 424,705

[30] Foreign Application Priority Data
Dec. 18, 1972  Japan.............................. 47-127425
Dec. 18, 1972  Japan.............................. 47-145677

[52] U.S. Cl. ................. 352/180; 352/121; 354/173
[51] Int. Cl. .......................................... G03b 21/48
[58] Field of Search ........... 352/121, 166, 204, 180; 354/170, 171, 173, 205

[56] References Cited
UNITED STATES PATENTS
3,448,670  6/1969  Suzuki .............................. 354/173
3,659,805  5/1972  Umeda.............................. 352/166
3,710,705  1/1973  Kimura ............................. 354/171
3,753,391  8/1973  Kimura ............................. 354/171

*Primary Examiner*—Monroe H. Hayes
*Attorney, Agent, or Firm*—Toren, McGeady and Stanger

[57]       ABSTRACT

According to the present invention a switching means is connected with the driving means of the electrical driving device for the film mechanism in a camera. The film mechanism carries out at least film winding up and shutter driving one after another. The invention includes a means to control the duty cycle of said switching means and means to drive said driving means with a voltage regulated within a proper range so as to carry out the drive control of the film mechanism.

11 Claims, 13 Drawing Figures

ELECTRICAL DRIVING DEVICE FOR FILM MECHANISM

BACKGROUND OF THE INVENTION:

1. Field of the Invention

The present invention relates to an electrical driving device for a film mechanism of a camera to carry out the drive control of the film mechanism.

1. Description of the Prior Art

Until now the voltage alteration process has been known as a process to carry out the drive control of the driving mechanism in the electrical driving devive for a film mechanism. When it is desired to alter the ratio of the number of pictures per second of the motion picture camera, according to the voltage alteration process, the motor has to be used and its speed reduced, because the driving torque on the camera side is more or less constant when the motor is driven for a higher number of pictures per second. This occurs because the motor is driven with the lowered voltage. In short, the motor is used in the state of lower torque, so that depending upon the fluctuation of the torque on the camera side, the ratio of the number of pictures per second changes or, sometimes, the feeding of the film is not possible any longer. In the worst case, the motor stops so that the excess current can cause damage to the motor. Under such circumstance, the slip mechanism provided between the motor and the driving mechanism of the camera has to operate in such a manner that the mechanism allows the slipping so as not to stop the motor running with the low torque and that the mechanism transmit to the driving mechanism also of the camera the rotation of the motor running with the high torque. Since the manufacture as well as the adjustment of this kind of slip mechanism is difficult, the larger the mechanism becomes, the higher is the manufacturing cost.

The purpose of the present invention is to eliminate the above mentioned disadvantage. This is done in such a manner that the drive control of the driving motor is carried out by means of the duty ratio control of the switching in order to control the conductivity of the driving motor of the film mechanism.

The second purpose of the present invention is to enable the drive of the driving motor of the film mechanism to be carried out by means of a voltage regulated within a proper domain.

The third purpose of the present invention is to enable the drive of the film mechanism to be carried out smoothly when the film mechanism is to be driven with lower speed.

The fourth purpose of the present invention is to enlarge the domain of the drive control of film mechanism.

BRIEF DESCRIPTION OF THE DRAWINGS

FIGS. 10 a, b and c respectively show the state of voltage given to the motor, being regulated by means of the circuit in FIG. 3.

DESCRIPTION OF THE PREFERRED EMBODIMENTS

The present invention will be explained according to the drawing of an embodiment which uses the film mechanism in a motion picture camera.

Figure 1:
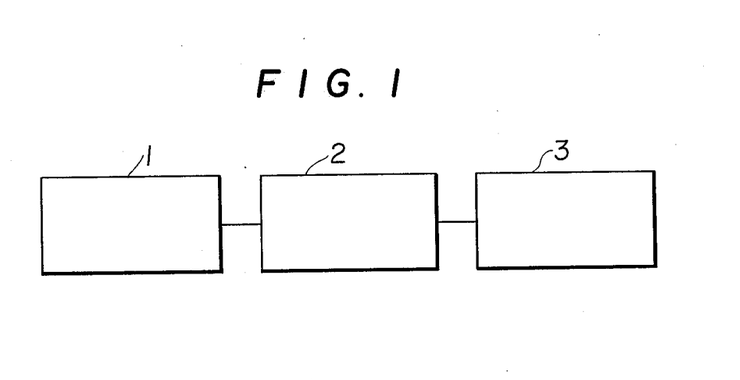
FIG. 1 shows a block diagram of an embodiment of the present invention.

FIG. 1 shows only the outline of the device, whereby 1 is the control circuit of the driving motor, 2 the slip mechanism and 3 the driving mechanism of the motion picture camera.

Figure 2:
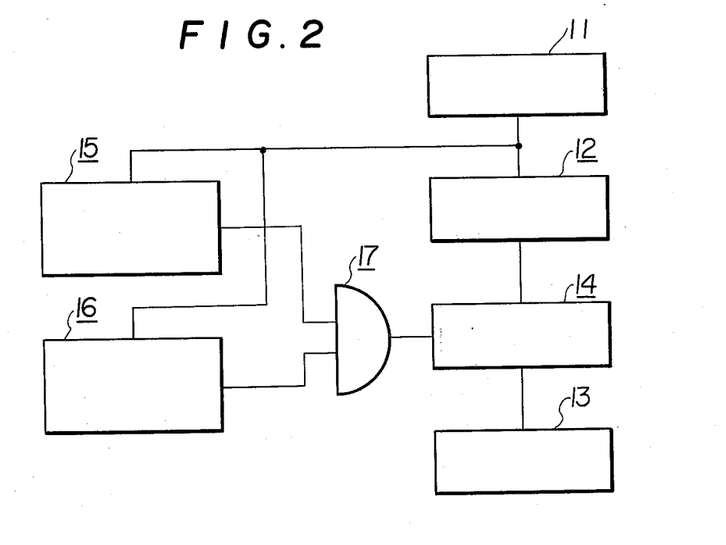
FIG. 2 shows a block diagram of the control circuit of the driving motor in FIG. 1.

FIG. 2 shows a block diagram of the control circuit 1 of the driving motor in FIG. 1, where 11 is the direct current source, from which a current is supplied to the driving motor 13 through the voltage control circuit 12 to control the voltage of said direct current source and the switching circuit 14 to close and open the circuit to the motor 13. Further a voltage of the direct current source is imposed on the rectangular wave generator 15 whose duty ratio is variable and on the voltage level detecting circuit 16 to regulate the output. The output signal of the rectangular wave generator 15 and that of the volatge level detecting circuit 16 are supplied to the switching circuit 14 through the OR-circuit 17 in such a manner that the closing and the opening of the switching circuit 14 can be controlled.

Figure 3:
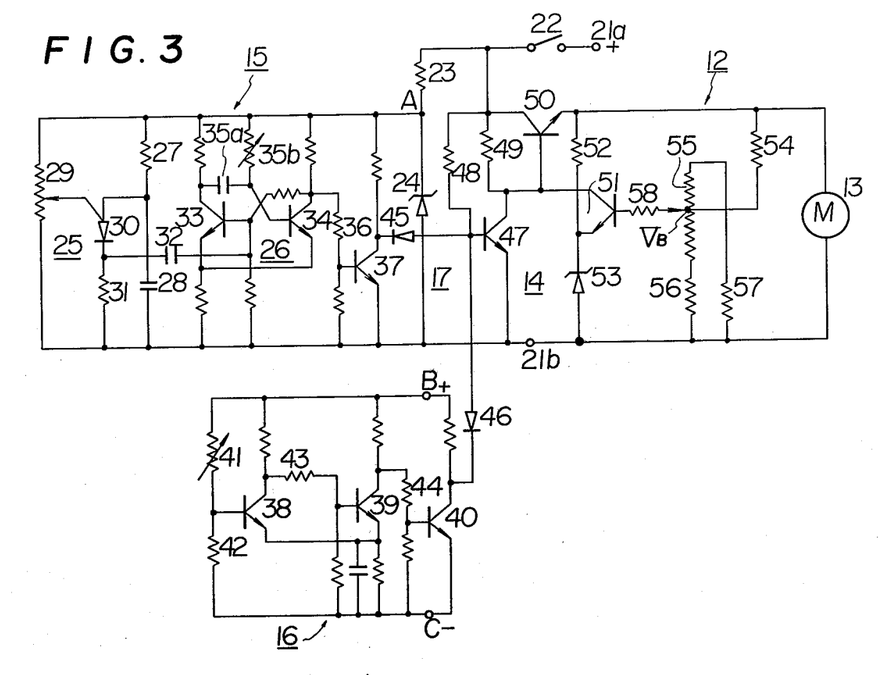
FIG. 3 shows a specific embodiment of the control circuit of the driving motor in FIG. 1.
Figure 4:
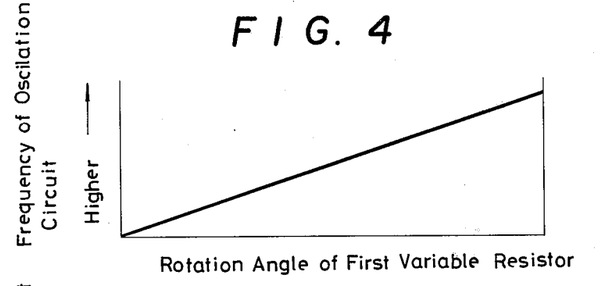
FIGS. 4, 5, 6 and 7 respectively show an output wave form at various parts of the circuit in FIG. 3.
Figure 5:
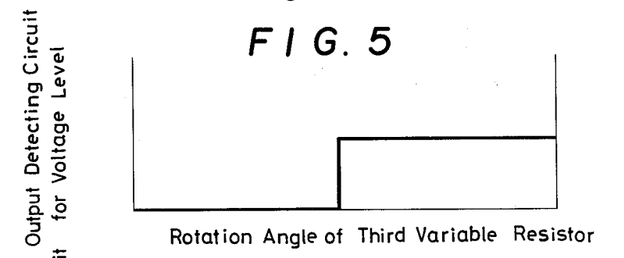
Figure 6:
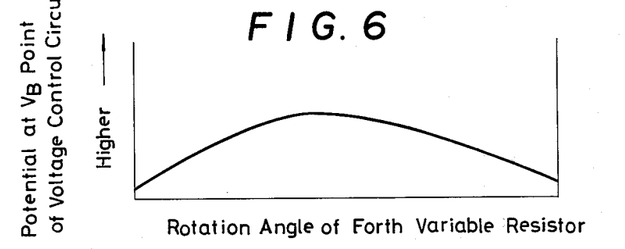
Figure 7:
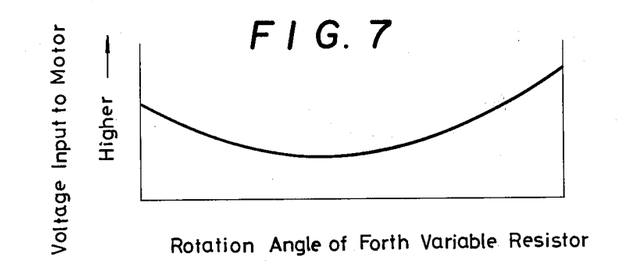

The control circuit 1 of the driving motor in FIG. 2 will be explained below in a specific way according to FIG. 3, whereby 12, 13, 14, 15, 16 and 17 are respectively the voltage control circuit, the motor, the switching circuit, the rectangular wave generator, the voltage level detecting circuit and the OR-circuit shown in FIG. 1. Positive and negative 21a and 21b are terminals connected with the direct current source 11. The positive terminal 21a is connected with the cathode of the constant voltage (zener) diode 24 through the main switch 22 and the resistance 23 one after the other, while the negative terminal 21b is connected with the anode of the constant voltage (zener) diode 24. The the rectangular wave generator 15 is connected between the point A at the positive potential side, to which the positive terminal 21a is connected through the switching circuit 22 and the resistance 23. The rectangular wave generator 15 is composed of the oscillating circuit 25 and the one shot circuit 26. In this oscillation circuit, a circuit having a resistance 27 and a condensor connected with each other in series and the first variable resistance 29 is connected in parallel between the point A at the positive potential side and the negative terminal 21b, whereby the anode of a programable unijunction 30 (hereinafter called PUJ) is connected to the point at which the first variable resistance 29 and the condensor 28 are connected with each other, while the gate of PUJ 30 is connected with the slidable contact of the first variable condensor 29 in such a manner that the cathode is connected with the negative terminal 21b through the resistance 31. The oscillating circuit 25 oscillates with the time constant determined by the resistance 27 and the condensor 28 and with the gate level of PUJ 30 so that by varying the gate level by means of the first variable resistance 29 the pulse frequency of the oscillation output can be varied as shown in FIG. 4. Further the cathode of PUJ 30 is connected with the base of the first transistor 33 in the one shot circuit 26 through the condensor 32. In this one shot circuit 26, the base of the second transistor 34 is connected to the collector of the first transistor 33 through the condensor 35a while the second variable resistance 35b is connected between the condensor 35a and the point A at the positive potential side in such a manner that when the oscillation pulse from the oscillation circuit 25 is supplied to the one shot circuit 26 as input, the first transistor 33 is switched on, while the second transistor 34 is switched off. The second transistor is again switched on after a lapse of a predetermined time by the time constant determined by the condensor 35a and the second variable resistance 35b, at which time the first transistor 33 is switched off again. The collector of the second transistor 34 of the one shot circuit 26 is connected to the base of the third transistor 37 through the resistance 36. The third transistor 37 is switched off when the second transistor is switched on, and is switched on when the second transistor is switched off, whereby the output is supplied to a circuit in the next step as the output of the rectangular wave generator. In this way the duty cycle can be varied by varying the first and the second resistance 29, 35b in the rectangular wave generator 15. Although not shown in the drawing, the voltage level detecting circuit 16 is connected between the positive terminal A and the negative terminal 21b in such a manner that the points A and B respectively, the negative terminal 21b and the point C are connected with each other. The voltage level detecting circuit 16 consists of the fourth, the fifth and the sixth transistor 38, 39 and 40. Namely between the points B and C, the third variable resistance 41 and a resistance 42 is connected in series, whereby the connecting point between the thrid variable resistance 41 and resistance 42 is connected with the base of the fouth transistor 38. The collector of the fourth transistor 38 is connected with the base of the fifth transistor 39 through the resistance 43, while the collector of the fifth transistor 39 is connected with the sixth transistor through the resistance 44. Accordingly, in the voltage level detecting circuit 16, the voltage dividing state of the third variable resistance 41 and the resistance 42 is adjusted by varying the value of the third variable resistance 41 in such a manner that before the divided voltage reaches the detecting level set in advance, the fourth transistor 38 is switched off, the fifth transistor 39 is switched on and the sixth transistor 40 is switched off. When the divided voltage reaches the detecting level set in advance, the fourth transistor 38 is switched on, the fifth transistor 39 is switched off and the sixth transistor 40 is switched on. Then the output is shown in FIG. 5. The collectors of the third and the sixth transistor 37 and 40 are connected with the positive terminal 21a through the firt and second diodes 45 and 46 composing the OR-circuit in reversed direction. The base of the seventh transistor 47 composing the switching circuit 14 is connected with the positive terminal 21a through the resistance 48 and the main switch 22, while the emitter is connected with the negative terminal 21b. The seventh transistor 47, which is the switching circuit 14 itself, is so designed as to be switched on only when both of the third and the sixth transistor 37 and 40 are switched off. In this manner, the voltage control circuit 12 is connected between the point behind the main switch 22 of the positive terminal 21a and the negative terminal 21b. This voltage control circuit 12 is designed as follows. Namely the base of the eighth transistor 50 is connected with the collector of the above mentioned seventh transistor and at the same time with the collector of the ninth transistor. The collector of the eighth transistor 50 is connected with the positive terminal 21a through the main switch and the emitter is connected with the negative terminal 21b through the resistance 52 and the reversely directed diode 53. Furthermore, the emitter is connected with the in-between tap of the fourth variable resistance 55 through the resistance 54. Both ends of the fourth variable resistance 55 are connected with the negative terminal 21b through the fifth and the sixth variable resistance 56 and 57 respectively. Further, the sliding contact of the fourth variable resistance 55 is connected with the base of the ninth transistor 51 through the resistance, while the emitter of the ninth transistor 51 is connected with a point at which the resistance and the constant voltage diode 53 are connected with each other. Between the emitter of the eighth transistor 50 and the negative terminal 21b, the motor 13 is connected. In the voltage control circuit 12, the potential at the point $V_B$ in the drawing can be varied as shown in FIG. 6 by varying the fourth variable resistance 55 in such a manner that the voltage to be imposed on the motor 13 can be varied as shown in FIG. 7.

The slip mechanism in FIG. 1 will be explained below according to FIG. 8, where 13 is the driving motor of the control circuit shown in FIG. 2. 80 is the shaft support fixed firmly on the electrical driving device body of the motion picture camera, on which shaft support 80 and a supporting shaft 81 is provided. The supporting shaft 81 is inserted into the shaft 82 rotatably mounted on the supporting shaft. On the one end at the side of the shaft support 80 of the shaft 82, a presser plate 83, which can be moved and adjusted upwards and downwards, is fixed firmly. On the other end of the shaft 82, a toothed wheel 84 is fixed firmly. Further, a receiver plate 85 is fixed firmly close to the toothed wheel 84 on the shaft. On the shaft 82 between the receiver plate 85 and the presser plate 83, a friction plate 86 and a toothed wheel 87 are mounted so as to form three layers together with the receiver plate 85, while between the toothed wheel 87 and the receiver plate, a spring 88 is provided so as to press against the toothed wheel 87 and the friction plate 86. In this manner, the toothed wheel 87 engages the toothed wheel 13a mounted on the rotary shaft of the driving motor 13. In this slip mechanism 2, the rotation transmitted to the toothed wheel 87 of the motor 13 is further transmitted to the toothed wheel 84 by means of the friction plate 86 and the receiving plate 85 when the torque of the driving motor 13 is less than the one set in advance; while the rotation transmitted to the toothed wheel 87 of the motor 13 is not transmitted to the toothed wheel 84 due to the slip taking place between the toothed wheel 87 and the friction plate 86 or the friction plate 86 and the receiver plate 85 when the torque of the driving motor 13 is more than the one set in advance. In this way, the torque is regulated and set, the strength of spring 88 being varied by adjusting the movement of the presser plate 83.

Figure 8:
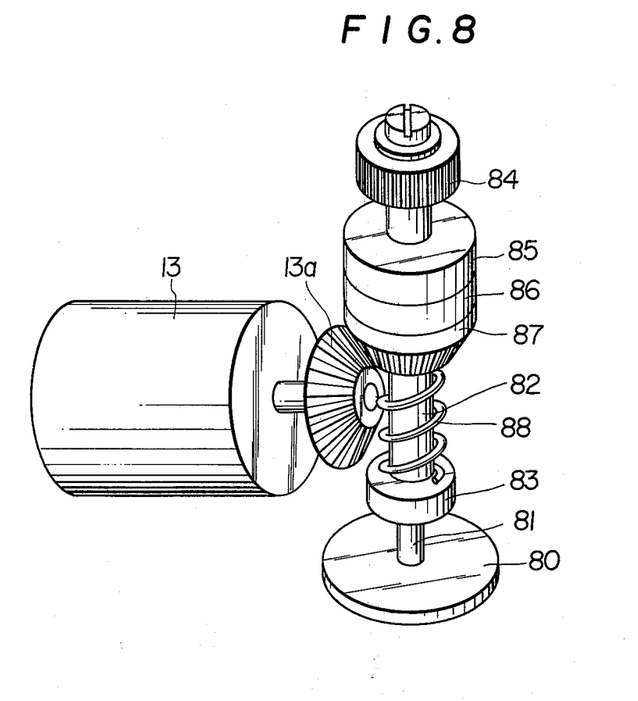
FIG. 8 shows a construction of the slip mechanism in FIG. 1.
Figure 9:
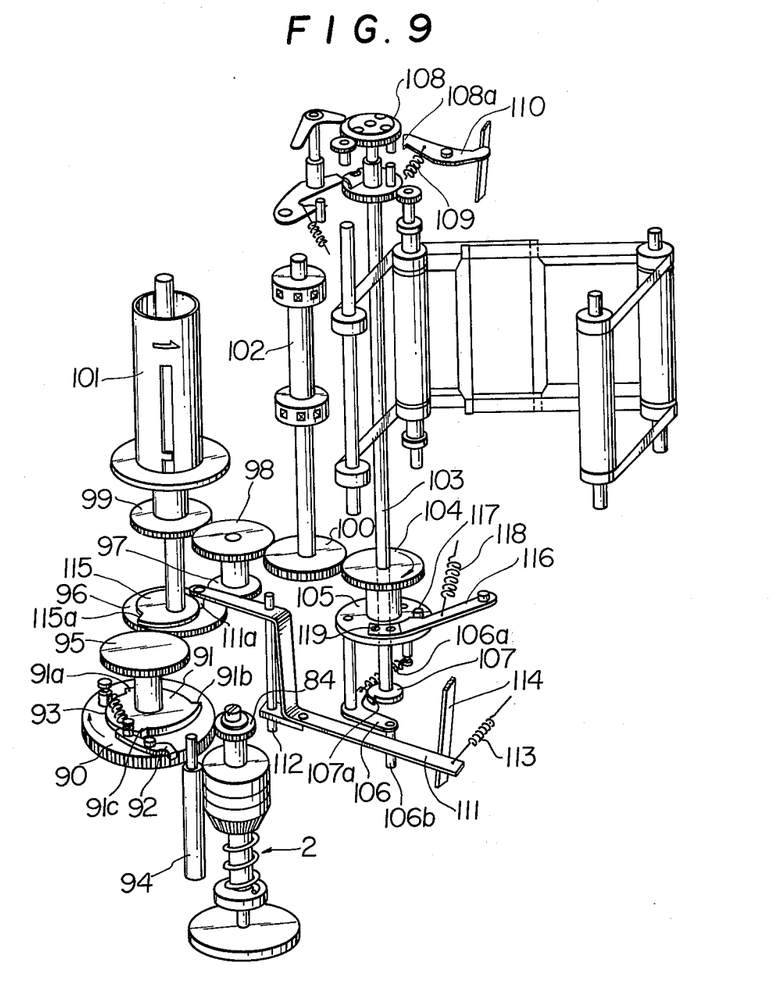
FIG. 9 shows a construction of the driving mechanism of camera.

FIG. 9 shows the driving mechanism 3 of the motion picture camera in FIG. 1, whereby the state immediately after the shutter operation is shown. 90 is a toothed wheel in engagement of the toothed wheel 84 of the slip mechanism 2 in FIG. 8. On the toothed wheel 90, a rotary ratchet wheel 91 concentric with the toothed wheel 90 and presenting three engaging parts 91a, 91b and 91c are mounted. On the toothed wheel 90, a claw 92 is mounted so as to rotate, which claw 92 is provided with a spring 93 so as to be able to engage with the engaging parts 91a, 91b and 91c of the ratchet wheel 91. When the toothed wheel 90 is rotated, being driven by the motor 13, the claw 92 engages with either of the engaging parts 91a, 91b or 91c so as to rotate the ratchet wheel 91, whereby after rotation of the claw 92 by a certain determined angle (240°), the other end of the claw 92 comes in touch with the fixed pin 94 in such a manner that the engagement of the claw 92 with either of the engaging parts 91a, 91b and 91c is lost. Further on the ratchet wheel 91 a toothed wheel 95 concentric with the toothed wheel 90 and rotatable together with the ratchet wheel 91 is provided. When driven in rotation, the toothed wheel 95 drives the spool gear 99 and the sprocket gear 100 by means of the three gears 96, 97 and 98 in such a manner that the spool 101 and the sprocket 102 are driven so as to wind up the film. The sprocket gear 100 is so designed as to charge the already known focal plane shutter when the gear 100 is rotated, by means of the gear 104 rotatable concentrically with the shutter main shaft 103, the disc 105 rotatable together with the gear 104, the charging claw 106 pivoted on the face of the disc 105 and the engaging plate 107 fixed firmly at the lower end of the shutter main shaft 103. On the upper part of the shutter main shaft 103, a gear 108 is in engagement with the gear on the ribbon shaft of the front focal plane, which gear 108 presents a holding abutment 108a, in such a manner that the gear 108 is held at the charge position when the abutment 108a engages with the holding lever 110 energized by the spring 109. 111 is the release lever pivoted so as to rotate around the shaft 112 as the center, whereby the one end is attracted by the spring in such a manner that the holding lever 110 is rotated against the strength of the spring 109 through the middle lever 114 so as to solve the engagement of the main shaft 103. The other end of the release lever 111 engages with the cam disc 115 constructed together with the gear 96 in such a manner that the release lever is driven by the cam disc. 116 is the reverse rotation lever presenting an oblique face engageable with the pin 117 mounted on the disc 105 for charging shutter, whereby the reverse rotation lever 116 rotates the disc along a direction contrary to that of film winding by a certain determined amount by means of the spring when the engagement of the gears 96, 97 and 98 with the driving motor 13 is solved. 119 is a stopper piece which engages with the reverse rotation lever 116 fixed firmly on the disc 105 in such a manner that the amount of the reverse rotation of the disc is limited.

Figure 10A:
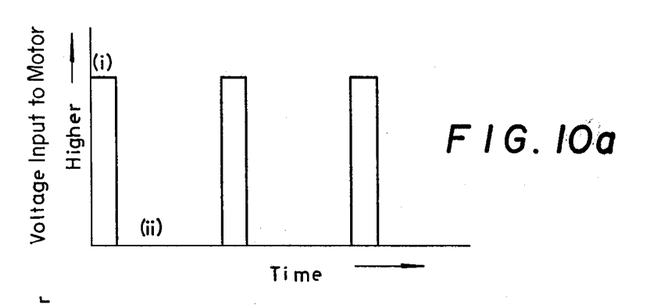

The operation of the above mentioned mechanism will be explained below. Reference is first made to the case when the driving mechanism 3 of the camera is driven with low speed. In the rectangular wave generator is of the control circuit 1 for the driving motor, the first and the second variable resistance are adjusted in such a manner that the duty ratio is small (for example, the first variable resistance 30 is adjusted in such a manner that the width of one cycle of the frequency becomes long), in the voltage level detecting circuit 16 the third variable resistance 41 is adjusted in such a manner that the voltage division of the third variable resistance 41 and of the resistance 42 does not reach the detecting level, while in the voltage control circuit 12 the fourth variable resistance 55 is adjusted in such a manner that the higher part of the voltage is imposed on the motor 13 as shown in FIG. 7. When in this state, the main switch 22 is closed, because in the voltage level detecting circuit 16, the voltage divided by the third variable resistance 41 and the resistance 42 does not reach the detecting level set in advance, the fourth transistor 38 is not switched on, while the fifth transistor is switched on and the sixth transistor remains switched off. At the same time in the rectangular wave generator 15, the gate level of PUJ 30 is high through the adjustment of the first variable resistance 29 so that the output pulse of low frequency is taken out of the generating circuit 25 and supplied to the one shot circuit 26. When the output pulse is supplied to the one shot circuit 26 from the generating circuit 25, the first transistor 33 is switched on while the second transistor 36 is switched off and the third transistor 37 remains switched on. Therefore, the seventh transistor 47 of the switching circuit 14 is switched off. Thus the eighth transistor 50 of the voltage control circuit 12 is switched on. Therefore the voltage control circuit 12 imposes on the motor 13 such voltage as is shown at i of FIG. 10a (the higher voltage in FIG. 7). Thus in the above mentioned one shot circuit 26, after a lapse of a certain time determined by the time constant of the second variable resistance 35b, and the condensor 35a the second transistor 34 is switched on while the first and the third transistor 33 and 37 are switched off. Thus the seventh transistor 47 of the switching circuit 14 is switched on, whereby the eighth transistor 50 of the voltage control circuit 12 is switched off in such a manner that no voltage is imposed on the motor 13 as shown in ii of FIG. 10a. When then the oscillation output pulse is supplied to the one shot circuit 26 from the oscillation circuit 25, the second cycle is started and completed as the first cycle. By repeating the above mentioned operation the pulse voltage as shown in FIG. 10a is imposed on the motor 13. The rotation of the motor 13 by means of such pulse voltage is transmitted to the gear 87 of the slip mechanism 2. This slip mechanism 2 transmits the rotation of the gear 87 by means of the motor 13 to the gear 84 through the friction disc 86 and the receiving plate. The rotation of the gear 84 is further transmitted to the gear 90 of the driving mechanism 3 of the camera. When the gear 90 is rotated in the driving mechanism 3 of the camera, the claw 92 on the gear 90 engages with the engaging part 91a of the ratchet wheel 91 in such a manner that the gears 96, 97 and 98 are operated so as to wind up the film. When further the gear 104 is rotated a little in the clockwise direction, the end of the charging claw 106 pressed by the spring 106a engages with the abutment 107a of the engaging disc 107 in such a manner that the main shaft 103 starts to rotate together with the disc 105.

When the main shaft 103 has completed a certain determined amount of rotataion necessary for shutter charging, the engaging abutment 108a mounted on the gear 108 passes over the end of the holding lever 110 until the engaging abutment 108a is in a position to engage with the holding lever 110.

In the meantime, the cam plate 115 combined with gear 96 as one body completes about a half rotation until the cam plate 115 engages with the one end of the release lever 111, whereby the release lever 111 is rotated along the clockwise direction against the spring 113 in such a manner that the holding lever 110 is kept in a position at which the lever can not be released.

When the main shaft 103 has completed a certain determined amount of rotation as mentioned above, the engagement of the abutment 115a of the cam disc 115 with the one end 111a of the release lever 111 is completed, whereby the pin 106b fixed firmly on the charging claw 106 provided on the disc 105 is in a position at which the pin 106b can engage with the release lever 111 in such a manner that the release lever 111 is kept by the pin 106b.

When the gears 96, 97, and 98 are further rotated due to the rotation of the motor 13, the main shaft 103 is rotated until the shaft 103 goes beyond the charging position in such a manner that the shutter is overcharged. In this way, the spin 117 fixed firmly on the disc 105 engages with the oblique face of the reverse rotation lever 116 in such a manner that the lever 116 is rotated along the counterclockwise direction against the strength of fthe spring 118. When then the end of the claw 92 provided on the gear 90 comes in touch with the firmly standing pin 94, the claw 92 is rotated along the counterclockwise direction against the strength of the spring 93 until the engagement of the end of the claw 92 with the engaging part 107a is completed in such a manner that the rotation of the motor 13 is no longer transmitted by the gears 96, 97 and 98.

At this time, the reverse rotation lever 116 pushes the pin 117 by means of the strength of the spring 118 so as to rotate the disc 105 in a reverse direction. At this time, the main shaft 103 is rotated in a reversed direction by an amount corresponding to that for overcharging the shutter until the holding engaging abutment 108a of the gear 108 engages with the holding lever 110, while the disc 105 is further rotated in a reversed direction, being pushed by the reverse rotation lever 116 in such a manner that the end of the charging claw 106 leaves the abutment 107a of the engaging plate. Thus, the release lever 111 held by the pin 106b rotates the charging lever 106 along the counterclockwise direction by means of the strength of the spring 113 in such a manner that the holding lever 110 is pushed through the middle lever 114 until the main shaft 103 is freed so as to release the shutter. In this way the focal plane shutter is released according to the already known process.

While the shutter is being operated, the motor 13 continues to rotate, whereby when the claw 92 engages either of the engaging parts 91a, 91b and 91c of the ratchet wheel 91 again the gears 96, 97 and 98 are driven so as to start the next winding up operation in such a manner that while the motor 13 is being rotated, the film winding up operation, the shutter charging operation and shutter release operation are repeated and the photographing is carried out continuously at slow speed.

Figure 10B:
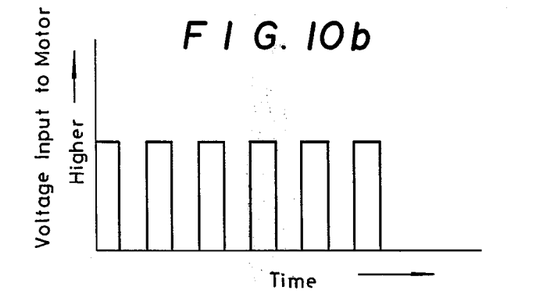

The case of the driving mechanism 3 being driven at middle speed will be explained below. In the rectangular wave generating circuit 15, the first and the second variable resistance 29 and 35b are regulated in such a manner that the duty ratio is large enough; in the voltage level detecting circuit 16, the third variable resistance 41 is regulated in such a manner that the voltage divided by the third variable resistance 41 and the resistance 42 does not reach the detecting level; while in the voltage control circuit 12 and fourth variable resistance 55 is regulated in such a manner that the part with low voltage shown in FIG. 7 is not imposed on the motor 13. When the main switch 22 is closed in the above mentioned state, the operation of the circuit is just the same as the driving mechanism 3 being driven at the low speed, whereby the pulse voltage as shown in b of FIG. 10 is imposed on the motor 13. The rotation of the motor 13 driven by a pulse voltage as mentioned above is transmitted to the driving mechanism 3 through the slip mechanism 2 whose operation is explained above, whereby the driving mechanism of camera 3 operates as explained above in such a manner that so long as the motor 13 continues the operation, the film winding up operation, the shutter charging operation and the shutter releasing operation are repeated and the photographing is carried out continuously at middle speed.

Figure 10C:
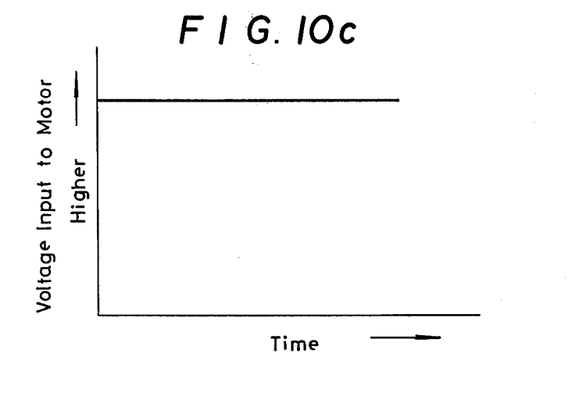

The case when the driving mechanism 3 of the camera will be explained at high speed. In the voltage level detecting circuit 16 the third variable resistance 41 is regulated in such a manner that the voltage divided by the third variable resistance 41 and the variable resistance 42 reaches a certain determined detecting level while in the voltage control circuit 12 the fourth variable resistance 55 is regulated in such a manner that the part with high voltage shown in FIG. 7 is imposed on the motor 13. When the main switch 22 is closed in the above mentioned state, the voltage divided by the third variable resistance 41 and the resistance 42 in the voltage level detecting circuit 16 already reaches the detecting level, the fourth transistor 38 is switched on and the fifth transistor 39 is switched off, whereby the sixth transistor 40 remains switched on. Thus the seventh transistor 47 of the switching circuit 14 is switched off, while the eighth transistor 50 in the voltage control circuit 12 is switched on. In this way a direct current as is shown in FIG. 10c is imposed on the motor 13 from the voltage control circuit 12. The rotation of the motor 13 driven by the direct current as mentioned above is transmitted to the driving mechanism 3 of the camera by means of the slip mechanism 2, whose operation is explained above. The driving mechanism 3 of the camera operates just as mentioned above in such a manner that so long as the motor 13 continues to rotate the film winding up operation, the shutter charging operation and the shutter release operation are repeated and thus the photographing is carried continuously at high speed.

Figure 11:
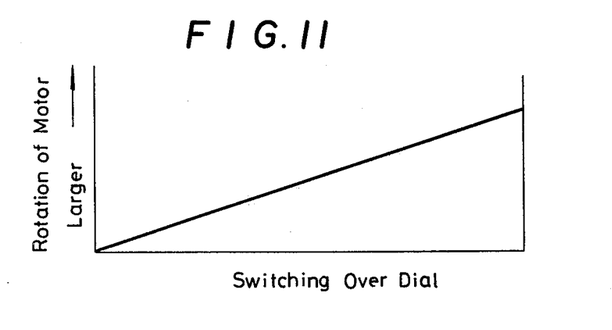
FIG. 11 shows a characteristic curve of the variation of the number of rotation of the motor, being regulated by means of the circuit in FIG. 3.

Thus at least it is possible to couple functionally the first, the third and the fourth variable resistances 29, 41 and 55 with each other so as to be regulated by a switching over dial in order that the voltage to be imposed on the motor 13 may be used to regulate the number of rotation of the motor 13 as shown in FIG. 11. In this way the driving of the driving mechanism 3 of the camera can be varied from low speed up to high speed freely.

As explained above according to the present invention the film mechanism is driven at low speed while the driving motor is giving out a high torque, the film mechanism can be driven smoothly in a wide range from slow speed up to high speed quite independently of the fluctuation of the torque of the film mechanism in such a manner that the control range of the film driving mechanism can be enlarged. Because further it is no longer necessary to use the conventional slip mechanism by means of which the slip takes place when the torque is low while no slip takes place when the torque is high, a slip mechanism whose production and regulation are simple can be realized. In this manner, it is possible to offer an electrical driving device for a film mechanism which is quite effective for making the mechanism compact and economical.

What is claimed is:

1. For a camera, an electrical drive system operable from a current source comprising:
   a. an electromotor;
   b. a switching means for supplying a voltage from the current source to said motor; a voltage control means for controlling the voltage of said current source, said voltage control means being connected between said current source and said switching means;
   c. a rectangular wave generating means for producing output pulses and controlling the switching operation of said switching means; and
   d. speed regulating means including means for adjusting the voltage of said voltage control means and means for setting the duty cycle of said rectangular generating means for driving the electromotor freely within a range from lower speed up to higher speed.

2. An electrical drive system according to claim 1, wherein said speed regulating means includes a voltage level detecting means with means either for switching its output on or off, said voltage detecting means being coupled to said switching means for controlling said switching means.

3. A drive control means of an electromotor in the electrical drive system of a camera according to claim 1, in which the switching means are transistors.

4. A drive control means of an electromotor in the electrical drive system of a camera according to claim 1, in which the rectangular wave generating means includes an oscillation circuit and a one shot circuit.

5. A camera electrical drive system operable from a current source for shutter charging and for film winding and thereafter releasing a shutter comprising:
   1. a drive device including:
      a. a wind-up member,
      b. a shutter releasing member, and
      c. an engaging member for operating said wind-up member and said shutter releasing member consecutively;
   2. a drive control means for controlling said drive device including:
      a. an electromotor for operating said engaging means,
      b. a switching means for supplying a voltage from the current source to said motor; a voltage control means for controlling the voltage of said current source, said voltage control means being connected between said current source and said switching means;
      c. a rectangular wave generating means for producing output pulses and controlling the switching operation of said switching means;
      d. speed regulating means including means for adjusting the voltage of said voltage control means and means for setting the duty cycle of said rectangular generating means for driving the electromotor freely within a range from lower speed up to higher speed; and
      e. a voltage level detecting means with means either for switching its output on or off, said voltage detecting means being coupled to said switching means for controlling said switching means;
   3. a slip means provided between said electromotor and said engaging member, said slip means transmitting the drive of said electromotor to said engaging member.

6. An electrical driving device for film winding comprising:
   a film winding means including an electromotor;
   a source of electrical power for said motor;
   a duty-factor setting means for controlling the duty factor of said power source to said electromotor;
   a duty-factor controlling circuit connected to said duty-factor setting means; and
   a switching means controlled by said duty-factor control circuit for coupling the power source to said motor.

7. An electrical driving device for camera comprising:
   a film winding means including an electromotor;
   a source of electrical power for said motor;
   a shutter winding means driven by said electromotor;
   a duty-factor setting means for controlling the duty-factor of said power source to said electromotor;
   a duty-factor controlling circuit connected to said duty-factor setting means; and
   a switching means controlled by said duty-factor control circuit for coupling the power source to said motor.

8. In a motion-picture camera of the type having means for shutter setting, for film wind-up and for shutter release and a driving mechanism for operating said means and wherein the driving mechanism includes a d.c. motor, the improvement comprising electrical means for controlling said motor, said means including:
   a d.c. current source;
   switching means for supplying the voltage from said d.c. current source to said motor;
   voltage control means responsive to said switching means and current source for controlling the voltage of said current source; and
   rectangular wave generating means for controlling the switching operation of said switching means.

9. The camera of claim 8 wherein said rectangular wave means includes means for adjusting and setting the duty-factor of its output pulse and wherein said voltage control means includes means for adjusting its output level, said motor being capable of a range of speeds by said adjustments.

10. The camera of claim 8 also includes a voltage level detecting means including means for adjusting the detecting level for supplying a high or low output depending on the level detected, said voltage detecting means being coupled to said switching means, said detecting means for supplying a constant signal to said motor during one of its output states.

11. The camera of claim 10 also including an OR gate, said OR gate responsive to the outputs of said voltage level detecting means and said rectangular wave generating means, the output of said OR gate being coupled to said switching means.

* * * * *